United States Patent
Shelton et al.

(10) Patent No.: US 6,793,906 B2
(45) Date of Patent: Sep. 21, 2004

(54) METHODS OF MAKING MANGANESE SULFIDE

(76) Inventors: Robert W. Shelton, 91 Hermitage Hills Blvd., Hermitage, PA (US) 16148; Donald R. Long, 723 N. Edgewater Dr., Plant City, FL (US) 33565

( * ) Notice: Subject to any disclaimer, the term of this patent is extended or adjusted under 35 U.S.C. 154(b) by 0 days.

(21) Appl. No.: 10/116,769

(22) Filed: Apr. 4, 2002

(65) Prior Publication Data

US 2003/0190280 A1 Oct. 9, 2003

(51) Int. Cl.$^7$ .................................. C01G 1/12
(52) U.S. Cl. .................... 423/561.1; 423/565
(58) Field of Search .................. 423/565, 561.1

(56) References Cited

U.S. PATENT DOCUMENTS

| | | | |
|---|---|---|---|
| 3,847,594 A | 11/1974 | Van Der Meulen et al. | 75/63 |
| 3,923,629 A | 12/1975 | Shaffer | 204/260 |
| 3,948,656 A | 4/1976 | Maxwell | 96/1.5 |
| 3,962,051 A | 6/1976 | Symens et al. | 204/108 |
| 3,980,761 A | 9/1976 | Thompson et al. | 423/565 |
| 4,007,055 A | 2/1977 | Whittingham | 423/565 |
| 4,069,301 A | 1/1978 | Thompson | 423/565 |
| 4,083,924 A | 4/1978 | Styring | 423/88 |
| 4,084,046 A | 4/1978 | Whittingham | 429/194 |
| 4,137,297 A | 1/1979 | Thorp et al. | 423/561 |
| 4,203,861 A | 5/1980 | Thorp et al. | 252/182.1 |
| 4,216,023 A | 8/1980 | Kinstle | 106/293 |
| 4,259,296 A | 3/1981 | Hennion et al. | 423/53 |
| 4,307,157 A | 12/1981 | Joshi et al. | 429/50 |
| 4,320,178 A | 3/1982 | Chemla et al. | 428/698 |
| 4,337,239 A | 6/1982 | Ruhs et al. | 423/561 |
| 4,456,520 A | 6/1984 | Phillips et al. | 204/291 |
| 4,468,278 A | 8/1984 | Cadoret et al. | 156/610 |
| 4,539,052 A | 9/1985 | Palmer et al. | 148/6.24 |
| 4,676,970 A | 6/1987 | Todd et al. | 423/561 |
| 4,695,447 A | 9/1987 | Shultz | 423/659 |
| 4,772,457 A | 9/1988 | Panster et al. | 423/561 |
| 4,816,235 A | 3/1989 | Pesic | 423/32 |
| 5,035,874 A | 7/1991 | Higa et al. | 423/509 |
| 5,151,262 A | 9/1992 | Pemsler et al. | 423/561.1 |
| 5,182,203 A | 1/1993 | Ebersole et al. | 435/196 |
| 5,196,306 A | 3/1993 | Bobrow et al. | 435/7.9 |
| 5,327,998 A | 7/1994 | Rosado et al. | 184/55.1 |
| 5,423,284 A | 6/1995 | Nishimura et al. | 117/84 |
| 5,583,001 A | 12/1996 | Bobrow et al. | 435/7.5 |
| 5,731,158 A | 3/1998 | Bobrow et al. | 435/7.5 |
| 5,768,678 A | 6/1998 | Chopra et al. | 419/37 |

OTHER PUBLICATIONS

Copy of the EPO European Search Report dated Jun. 16, 2003 (EP 03 39 4037).

*Primary Examiner*—Ngoclan T. Mai
(74) *Attorney, Agent, or Firm*—Woodcock Washburn LLP

(57) ABSTRACT

The present invention provides methods for making manganese sulfide without the need for recycling a significant amount of manganese sulfide back to the reaction chamber. The methods are performed by admixing substantially pure manganese, substantially pure sulfur, and iron pyrite. The manganese and sulfur are then reacted to form manganese sulfide. Iron pyrite regulates the reaction and enables the use of conventional equipment in the methods of the present invention. After the reaction ends, the manganese sulfide product is separated from the unreacted manganese, sulfur, and iron.

20 Claims, 2 Drawing Sheets

METHODS OF MAKING MANGANESE SULFIDE

FIELD OF THE INVENTION

This invention relates to methods of making manganese sulfide. In particular, the present invention relates to methods of making manganese sulfide using iron pyrite as a reaction moderating material.

BACKGROUND

Manganese sulfides occur routinely when making steel. Sulfur is present in many of the raw materials to make steel and manganese has long been one of the most common and inexpensive alloying elements used in steelmaking. During melting and refining, the sulfur present in the molten raw materials selectively combines with manganese to form manganese sulfides (MnS). In addition to preventing sulfur from causing a hot short condition in the iron matrix during hot working, the discrete manganese sulfide particles (commonly referred to as inclusions) also serve as chip breakers during subsequent machining operations. These natural breaks in the chips generated during a machining operation reduce tool wear, and allow better control of the machining and a better surface finish on the final part.

Many metallurgical powders used to fabricate powder metal parts are made from pure elemental powders, such as iron, manganese and chrome. When using powders that do not contain sulfur, no inclusions are formed. Therefore, machining the metal parts made from powders without sulfur is difficult and expensive. The addition of pure sulfur powder is not a solution to this difficulty because sulfur powders are potentially both safety and environmental hazards. In addition, sulfur powder may not react, or completely react, to form MnS.

Thus, the value of metallurgical powders can be greatly enhanced by introducing an engineered MnS powder to control the size and distribution of MnS inclusions. This approach led to the desire to produce MnS with controlled chemical properties having specific particle sizes to maximize the benefits of MnS inclusions while minimizing other undesirable properties.

As an additive in powder metallurgy techniques (PM), manganese sulfide enhances performance and machinability of metal articles made by PM processes. Improved machinability is desired where metal part designs have increasingly complex geometry features and surface textures.

Current demand for manganese sulfide cannot be met by mining techniques because an insufficient amount of manganese sulfide exists in the earth's crust. The metallurgical industry has therefore turned to artificial means of producing manganese sulfide.

Traditional methods of synthesizing manganese sulfide have undesirable properties, such as for example, producing high concentrations of impurities, creating sulfur pollution, and producing low yields at high costs. For example, manganese sulfide can be synthesized with submerged arc furnaces that utilize manganese containing ores and sulfur bearing materials. Manganese sulfide is also produced by precipitating manganese sulfide from an aqueous solution of manganese salt and alkaline sulfide. Another technique thermally reduces manganese sulfate with carbon or hydrogen to form manganese sulfide. These techniques produce large quantities of environmentally hazardous vaporized sulfur and the manganese sulfide products produced therefrom have high impurity concentrations.

Techniques that yield small quantities of manganese sulfide are undesirable such as for example those techniques that recycle a portion of manganese sulfide product from one reaction to a second reaction. Conventional techniques recycle between about 15% to about 40% of the final manganese sulfide product of one reaction to control the reaction parameters of a subsequent reaction.

Other conventional methods of producing manganese sulfide are known and described in U.S. Pat. Nos. 4,676,970 and 5,768,678 which are herein incorporated by reference. The 970 patent describes a method for making a fused compound wherein a product is recycled during the reaction. The 678 patent describes a metal sulfide composition for use as a machining aid.

The metallurgical industry is in search of reliable, low cost, environmentally friendly methods of making commercial quantities of high purity manganese sulfide. Methods that address these needs have long been sought.

BRIEF DESCRIPTION OF THE DRAWINGS

The numerous features and advantages of the present invention may be better understood by those skilled in the art by reference to the accompanying detailed description and the following drawings, in which.

SUMMARY OF THE INVENTION

Figure 1:
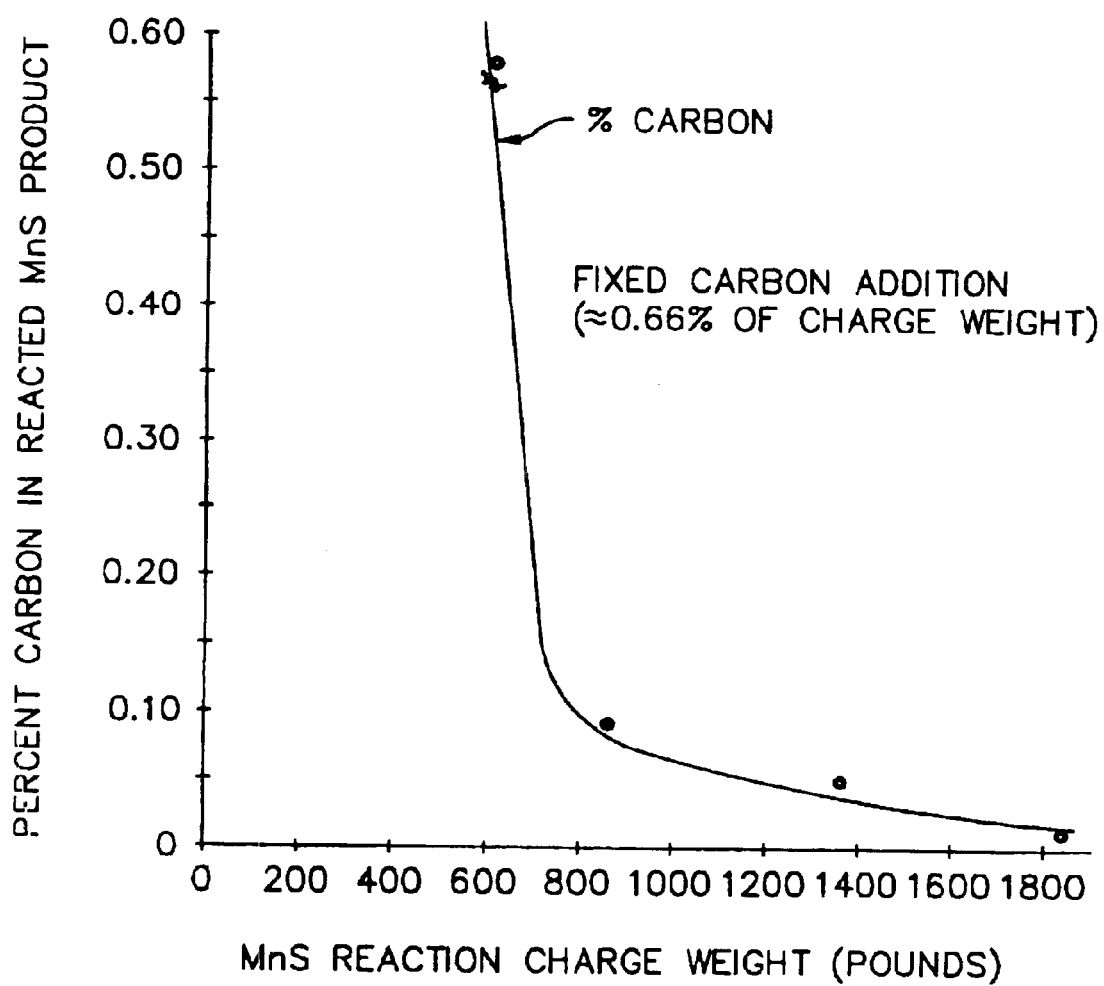
FIG. 1 is a graph of weight percent carbon in a manganese sulfide product verses the total weight of initial reactants.

The present invention provides methods for making manganese sulfide compounds without the need for recycling a significant amount of manganese sulfide back to the reaction chamber from an earlier reaction. The methods are performed by reacting substantially pure manganese with substantially pure sulfur in the presence of iron pyrite. First, the substantially pure manganese, substantially pure sulfur, and iron pyrite are admixed. Then the admixture is reacted in a reaction chamber. After the reaction is complete, the manganese sulfide compound is recovered. In some embodiments, carbon is added to the reaction chamber to control the oxygen content of the final manganese sulfide compound.

The term manganese sulfide compound as used in the specification and claims herein means compounds composed substantially of manganese monosulfide (MnS). Manganese sulfide compounds may also include carbon, oxygen, or impurities. The term substantially pure as used in the specification and claims is defined as used in the metallurgical industry. The term impurity refers to impurities commonly found in the formation of manganese sulfide or those impurities found in the materials added to the reaction chamber.

Thermodynamic calculations show that the direct combination of equimolar quantities of manganese and sulfur to produce manganese sulfide is an extremely exothermic reaction. Starting at room temperature the adiabatic reaction temperature is greater than 2500° Centigrade. Once initiated, the reaction is self-sustaining and can be quite violent until the reactants are depleted. Sulfur can vaporize during this process.

The present methods control the violent reaction between manganese and sulfur and reduce sulfur vaporization by adding iron pyrite to a reaction chamber prior to initiating the exothermic reaction. The iron pyrite regulates the reaction and enables the use of conventional equipment by absorbing heat from the manganese and sulfur reactants. If excess heat is generated during the reaction, a layer of the reaction vessel wall may melt at the interface between the reaction vessel and the reactants. Melting the reaction vessel reduces the life of the mold and affects the yield of manganese sulfide compound. Excess heat also causes environmental pollution as the heat forms gases that carry un-reacted materials out of the reaction chamber. Loss of un-reacted materials ultimately lowers the yield of manganese sulfide compound.

Excess heat also raises the oxygen content of the manganese sulfide product. Low oxygen concentrations are preferred as the manganese sulfide product is often crushed and ground into a fine powder. The crushing and grinding process increases the oxygen concentration of the manganese sulfide compound as it exposes pure, readily oxidizable manganese sulfide to the atmosphere. The formation of oxide layers on PM powders is undesirable in many applications because an oxide layer inhibits diffusion. Without being limited by theory, it is believed that an oxide layer also inhibits bonding between adjacent PM powders particles. High oxygen concentrations can be detrimental to the strength and impact toughness of PM parts.

Adding carbon to the reaction chamber before or during the reaction lowers the oxygen concentration in the manganese sulfide product. Adding carbon to the initial reactants also inhibits the exothermic reaction. Without being limited by theory, it is believed that carbon reacts with oxygen present during the reaction thereby decreasing the amount of oxygen available to sustain the reaction. Accordingly, low oxygen concentrations translate to less heat and therefore longer reaction times. Adding carbon to the reaction chamber also decreases the concentration of iron in the manganese sulfide product.

In accord with preferred embodiments, manganese sulfide compounds are prepared by first admixing substantially pure manganese, substantially pure sulfur, and iron pyrite by blending techniques known in the powder metallurgy industry. For example, the reactants can be admixed in a low intensity mixer, such as a commercial V blender, to prevent the creation of thermal energy that might initiate the exothermic reaction. In one embodiment, the reactants are in particle or flake form of "high purity" as defined in the powder metallurgy industry. Preferably, both sulfur and manganese have a purity greater than about 99%. Substantially pure manganese can be obtained from the aqueous electrolysis of manganese sulfate solution or readily purchased commercially. For example, manganese powder is available from Tophet Alloys Corp. of Paoli, Pa. Substantially pure sulfur, iron pyrite, and carbon can also be purchased commercially, for example, flake sulfur and ground sulfur are available from Stetson Chemical Co. of Buffalo, N.Y. Iron pyrite is available from American Mineral of King of Prussia, Pa.

In one embodiment, manganese powder, ground and/or flaked sulfur, and iron powder are admixed together. In another embodiment, manganese is alloyed with another metal prior to the admixing step. For example, manganese can be alloyed with iron to form ferromanganese. Without being limited by theory, it is believed that, during the reaction the alloying metal acts as a heat sink to absorb some of the heat generated by the reaction between sulfur and manganese.

Manganese powder may range in particle size of from about 30 to about 180 microns; iron pyrite powder may range in particle size of from about 20 microns to about 2 mm; ground sulfur may range in particle size of from about 10 to about 150 microns; and flaked sulfur may range in particle size of from about 0.5 to about 10 mm. However, those skilled in the art, would appreciate that the particle sizes of the ingredients may be varied depending on the desired reaction rate, and rate of cooling. The reactants should be of a similar size to minimize segregation during the mixing and the reaction phase. In a preferred embodiment, manganese powder particles are less than a 40 mesh size, sulfur powder particles are less than a 200 mesh size, sulfur flakes are less than 0.25 inches in diameter, and iron pyrite granules are less than a 20 mesh size.

When admixing the reactants, from about 40 to about 90 percent by weight manganese is admixed with from about 15 to about 50 percent by weight sulfur, and from about 2 to about 30 percent by weight iron pyrite. In preferred embodiments from about 50% to about 70% by weight manganese is admixed with from about 20% to about 40% by weight sulfur and from about 5 to about 20% by weight iron pyrite. More preferably, about 60% by weight manganese is admixed with about 30% by weight sulfur and from about 6 to about 15% by weight iron pyrite.

In one embodiment, an excess molar amount of manganese is added to reduce the formation of sulfur gas in the reaction vessel. Up to about 30% by weight excess manganese is admixed and more preferably from about 1% to about 20% by weight and even more preferably from about 2% to 10% by weight is added to the admixture. The amount of excess manganese is expressed as a weight percent of the total weight of the reactants. Preferably, any excess of manganese does not dissolve in the MnS compound in significant amounts.

In another embodiment, carbon is admixed with manganese and sulfur to reduce the amount of oxygen in the manganese sulfide product and to control the reaction. Carbon powders are commercially available, for example, carbon powder is available from JS McCormick, Inc. of Pittsburgh, Pa. Up to about 4% by weight carbon is admixed and more preferably 2% by weight and even more preferably less than 1% by weight is added to the initial reactants. The amount of carbon is expressed as a weight percent of the total weight of the reactants. Carbon powder particles may range in size from 30–200 microns. In a preferred embodiment carbon powder particles are less than a 12 mesh in size.

The weight percentage of each reactant in the admixture may be varied depending on factors related to the process and final product. For example, the weight percentage of each reactant in the admixture may be varied depending on the desired rate of cooling and control of the reaction, and to regulate the amount of sulfur fumes expelled from the reaction. The weight percentage of each ingredient in the initial blend may also be varied depending on the desired properties of the resultant MnS composition, and the desired structural characteristics of the powder metal part into which it is incorporated.

After the reactants are admixed, the admixture is disposed in a reaction vessel. The reaction is carried out in a conventional reaction chamber, for example vessels made from carbon, graphite, cast iron or copper can be used. Preferably, the reaction vessel is sealed, for example, by covering the vessel with a lid to minimize oxidation of the MnS product. Preferably, the size of the reaction vessel is large enough to contain the reactants and allow iron to precipitate out of the molten manganese sulfide that forms during the reaction.

In a preferred embodiment, a cast iron pot with a lid is used to provide a large surface area to volume ratio for efficient removal of heat from the highly exothermic reaction. A small opening, which may be manually or automatically opened or closed, may be included to vent excess sulfur fumes generated by the reaction.

Any conventional means known to the chemical process industry, for example, a lit igniter fuse, an electric wire or a chemical charge can initiate the reaction. Preferably, a chemical charge is used to initiate the reaction, and more preferably a chemical charge composed of aluminum and barium peroxide is used.

Once the reaction is initiated, the reaction temperature quickly increases so that a pool of molten MnS forms and envelops the remaining solid ingredients of the admixture as the reaction continues. The exothermic reaction between manganese and sulfur provides the energy needed to melt the iron pyrite. As the iron pyrite absorbs excess energy the reactants are cooled and the exothermic reaction is beneficially moderated. It is also believed that the iron pyrite inhibits the reaction between manganese and sulfur by limiting the interaction of manganese and sulfur molecules. It is believed that this mechanism moderates the exothermic reaction. Iron pyrite inhibits the reaction without the need for recycling a significant amount of MnS, i.e., adding MnS product from a previous reaction to the reaction chamber prior to initiating a reaction. The present methods improve product yield because the MnS product from one reaction does not have to be recycled into a later reaction.

The reaction ends when the concentration of unreacted manganese or sulfur is too low to sustain the reaction. As the reaction nears completion, the reactants and products separate into molten layers. Iron and unreacted manganese pool at the bottom of the reaction chamber with iron being the lowest layer. The iron and manganese form a slug or "button" on the bottom surface of the reaction vessel below the pool of molten MnS composition. Localized concentrations or particles of manganese may form in the manganese sulfide product during the reaction because manganese is slightly soluble in molten manganese sulfide. After the reaction ends, the temperature inside the reaction vessel decreases and the manganese sulfide product and excess reactants, if any, solidify.

After the MnS product solidifies, it is removed from the reaction vessel and separated from the button of iron and manganese by conventional methods known to the metallurgy industry. The reaction vessel is scraped clean and reloaded with another admixture of reactants as described above.

In one embodiment, the MnS product is further processed to form a powder using methods which are conventional to the powder metallurgy industry. For example, the manganese sulfide can be crushed and ground by equipment for coarse grinding including a hammer mill, jaw crushers, overhead eccentric crushers, Dodge type crushers, gyratory crushers of the primary, secondary and hydrocone (Allis-Chalmers) type crushers, and roll crushers. Grinding the metal sulfide into finer particles is accomplished by secondary grinding equipment such as for example, ball, rod, pebble mills or jet mills. Preferably, manganese sulfide is ground into small particles by a ball mill and finished with a jet mill.

EXAMPLES

The following examples, which are not intended to be limiting, present certain embodiments and advantages of the present invention. Unless otherwise indicated, any percentages are on a weight basis.

Manganese was reacted with sulfur in the presence of materials substituted for recycled manganese sulfide. In each of the examples, initial reactants were disposed in a cast iron pot. The reaction in each example was initiated with a barium peroxide charge that was ignited by a conventional fuse. The barium peroxide charge reacted to provide sufficient heat to start a reaction between the manganese and the sulfur. After the reaction was completed, the manganese sulfide product was separated from an iron button and the composition of the manganese sulfide product was analyzed by methods known to the metallurgical industry, such as for example by an inductively coupled plasma spectrometer (ICP) and by a carbon/sulfur determination performed by a LECO Corporation analyzer. The yield of each example was compared to the yield of manganese sulfide synthesized using recycled manganese sulfide material.

Different size reactions were examined ranging from approximately 10 pounds of starting materials to approximately 400 pounds of starting materials. After these initial reactions were performed, large reactions were conducted using from about 600 pounds to about 1850 pounds of starting materials. Examples 1–8 show the results of the large reactions.

Examples 1 & 2

Manganese was combined with flake sulfur, powdered sulfur, and iron pyrite in a reaction chamber. A reaction was initiated as described above to form a manganese sulfide product. No recycled manganese sulfide or carbon was added to the reaction chamber. Table 1 shows the quantity of each reactant in Examples 1 & 2:

TABLE 1

| | Manganese (lbs) | Sulfur (Flake, lbs) | Sulfur (Powder, lbs) | Carbon (lbs) | Iron Pyrite (lbs) |
| --- | --- | --- | --- | --- | --- |
| Ex. 1 | 1065 | 294 | 244 | 0 | 147 |
| Ex. 2 | 1065 | 294 | 244 | 0 | 147 |

When the reaction was completed, the manganese sulfide product was separated from the iron button that formed during the reaction and the composition of the MnS product was compared with manganese sulfide synthesized by methods that use recycled manganese sulfide materials. Table 2 shows the composition of the manganese sulfide product synthesized in examples 1 & 2:

TABLE 2

| | Manganese (%) | Sulfur (%) | Oxygen (%) | Carbon (%) | Iron (%) |
| --- | --- | --- | --- | --- | --- |
| Ex. 1 | 62.06 | 34.885 | 0.545 | 0 | 2.51 |
| Ex. 2 | 62.34 | 36.187 | 0.383 | 0 | 1.09 |

The yield of manganese sulfide product was determined by dividing the MnS product weight by the charge weight. The yield of Manganese sulfide was compared to the yield of conventional manganese sulfide synthesis methods that recycle manganese sulfide product. Manganese sulfide was synthesized conventionally by reacting 950 pounds of manganese powder, 550 pounds of sulfur powder, and 300 pounds of recycled manganese sulfide. The reaction produced 1769 pounds of manganese sulfide product. However, 300 pounds of product would be recycled for the next reaction. Therefore only 1469 pounds of usable manganese sulfide were produced thereby giving a yield of 81.61%.

Table 3 shows the yield for examples 1 & 2:

TABLE 3

|  | Charge Weight | Product Weight | MnS Yield % | Conventional Yield % |
|---|---|---|---|---|
| Ex. 1 | 1750 | 1670 | 95.43 | 81.61 |
| Ex. 2 | 1750 | 1654 | 94.51 | 81.61 |

It was determined that manganese sulfide could be synthesized without using recycled manganese sulfide materials. The composition of manganese sulfide obtained in examples 1 and 2 was comparable to the composition of manganese sulfide synthesized by methods using recycled manganese sulfide materials. The yield of examples 1 & 2 is significantly higher than the yield obtained by methods that use recycled manganese sulfide materials because no manganese sulfide was recycled back to the reaction chamber.

Examples 3, 4, & 5

Manganese was combined with flake sulfur, powdered sulfur, iron pyrite, and carbon in a reaction chamber. A reaction was initiated to form a manganese sulfide product. No recycled manganese sulfide was added to the reaction chamber. Table 4 shows the quantity of each reactant in Examples 3–5:

TABLE 4

|  | Manganese (lbs) | Sulfur (Flake, lbs) | Sulfur (Powder, lbs) | Carbon (lbs) | Iron Pyrite (lbs) |
|---|---|---|---|---|---|
| Ex. 3 | 369 | 100 | 83 | 3.859 | 50 |
| Ex. 4 | 517 | 140 | 116 | 5.392 | 70 |
| Ex. 5 | 832 | 225 | 188 | 9.042 | 112 |

When the reaction was completed, the manganese sulfide product was separated from the iron button that formed during the reaction. The composition of the MnS product was analyzed to determine the effect of adding carbon to the reaction chamber. It was determined that admixing carbon with Mn and S reduced the concentration of oxygen in the MnS product compared to methods that do not admix carbon. Table 5 shows the composition of the manganese sulfide products synthesized in Examples 3–5:

TABLE 5

|  | Manganese (%) | Sulfur (%) | Oxygen (%) | Carbon (%) | Iron (%) |
|---|---|---|---|---|---|
| Ex. 3 | 63.33 | 35.183 | 0.368 | 0.579 | 0.54 |
| Ex. 4 | 65.97 | 33.2917 | 0.378 | 0.0903 | 0.27 |
| Ex. 5 | 65.55 | 33.437 | 0.315 | 0.209 | 0.66 |

The yield of manganese sulfide product was determined for examples 3–5 by dividing the product weight by the total weight of the initial reactants. It was determined that adding carbon did not affect the yield of manganese sulfide product. Table 6 shows the yield for examples 3–5:

TABLE 6

|  | Charge Weight | Product Weight | MnS Yield % |
|---|---|---|---|
| Ex. 3 | 605.86 | 576 | 95.07 |
| Ex. 4 | 848.39 | 760 | 89.58 |
| Ex. 5 | 1366.04 | 1270 | 92.97 |

Examples 6, 7, & 8

Manganese was combined with flake sulfur, powdered sulfur, iron pyrite and carbon in a reaction chamber. A reaction was initiated to form a manganese sulfide product. No recycled manganese sulfide was added to the reaction chamber. In each example the amount of Mn, S, and iron pyrite were held constant while varying the amount of carbon. Table 7 shows the quantity of each reactant in Examples 6–8:

TABLE 7

|  | Manganese (lbs) | Sulfur (Flake, lbs) | Sulfur (Powder, lbs) | Carbon (lbs) | Iron Pyrite (lbs) |
|---|---|---|---|---|---|
| Ex. 6 | 1110 | 300 | 250 | 8.05 | 150 |
| Ex. 7 | 1110 | 300 | 250 | 10.045 | 150 |
| Ex. 8 | 1110 | 300 | 250 | 12.08 | 150 |

When the reaction was complete, the manganese sulfide product was separated from the iron button that formed during the reaction. The composition of the manganese sulfide product was analyzed to determine how additions of small amounts of carbon (less than 1%) admixed with Mn, S, and iron pyrite affected the concentration of oxygen in the manganese sulfide product. In all experiments, the oxygen level was controlled to an acceptable level with carbon additions of this level. Resulting carbon levels were also found to be acceptable for the product. Table 8 shows the composition of the manganese sulfide products synthesized in Examples 6–8:

TABLE 8

|  | Manganese (%) | Sulfur (%) | Oxygen (%) | Carbon (%) | Iron (%) |
|---|---|---|---|---|---|
| Ex. 6 | 62.91 | 35.294 | 0.224 | 0.322 | 1.25 |
| Ex. 7 | 68.25 | 30.54 | 0.311 | 0.209 | 0.69 |
| Ex. 8 | 63.72 | 35.4267 | 0.1 | 0.0133 | 0.74 |

Figure 2:
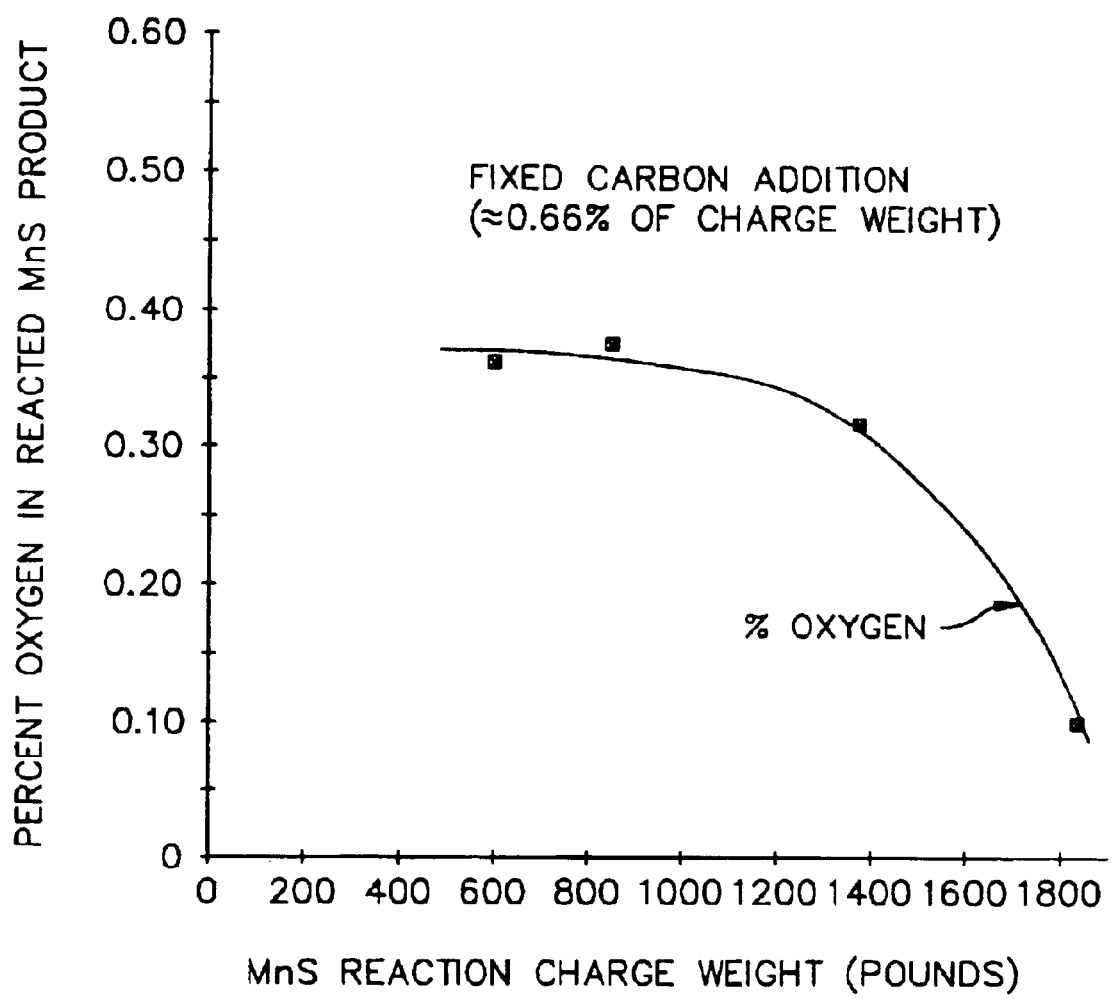
FIG. 2 is a graph of weight percent oxygen in a manganese sulfide product verses the total weight of initial reactants.

FIG. 1 is a graph of weight percent carbon in the manganese sulfide product verses the total weight of initial reactants. FIG. 2 is a graph of weight percent oxygen in the manganese sulfide product verses the total weight of initial reactants. Referring to FIGS. 1 & 2, it was also determined that, at a fixed concentration of carbon in the initial reactants (0.66%), the reaction of carbon and oxygen was more complete as the size of the reaction increased. Without being limited by theory, it is believed that this effect occurs because more energy is generated by the larger reaction over a longer period of time thereby encouraging the carbon oxygen reaction to be more complete, and reducing the resultant levels of oxygen and carbon in the final product.

The yield of manganese sulfide product was determined for examples 6–8 by dividing the manganese sulfide product weight by the weight of the initial reactants. As shown in Table 9, adding carbon to the initial reactants did not affect the yield of manganese sulfide product in examples 6–8:

TABLE 9

|  | Charge Weight | Product Weight | MnS Yield % |
|---|---|---|---|
| Ex. 6 | 1818.05 | 1668 | 91.75 |
| Ex. 7 | 1820.04 | 1660 | 91.21 |
| Ex. 8 | 1822.08 | 1658 | 90.99 |

Examples 1–8 show that iron concentrations found in the manganese sulfide product are comparable to iron concentrations found in manganese sulfide materials synthesized by methods that use recycled manganese sulfide. The amount of iron found in the manganese sulfide product changed as carbon was added to the initial reactants. It was found that the concentration of iron in the manganese sulfide product increases as the amount of carbon or iron pyrite added to the initial reactants increases. Without being limited by theory, it is believed this effect occurs because carbon and iron pyrite both act to control the heat of the reaction, and therefore the length of reaction. Longer reaction times provide a greater opportunity for iron to diffuse into the manganese sulfide product.

As those skilled in the art will appreciate, numerous changes and modifications may be made to the preferred embodiments of the invention without departing from the spirit of the invention. It is intended that all such variations fall within the scope of the invention.

What is claimed is:

1. A method for making manganese sulfide comprising: alloying substantially pure manganese with another metal to form an alloy; admixing said alloy with substantially pure sulfur, and iron pyrite; and reacting said alloy with said sulfur to form said manganese sulfide.

2. A method for making manganese sulfide comprising: admixing substantially pure manganese, substantially pure sulfur, and iron pyrite; and reacting said manganese with said sulfur to form said manganese sulfide, wherein said manganese is in stoichiometric excess of said sulfur by at least 10%.

3. A method for making manganese sulfide comprising: admixing substantially pure manganese, substantially pure sulfur, iron pyrite and carbon; and reacting said manganese with said sulfur to form said manganese sulfide.

4. The method of claim 1 further comprising the step of recovering said manganese sulfide by separating it from unreacted manganese, sulfur, and iron button.

5. The method of claim 1 wherein the iron pyrite is present in an amount effective to control the exothermicity of said reaction.

6. The method of claim 1 wherein said sulfur is in the form of a powder of particle size from about 0.001 to about 0.5 inches, flake material, or combination thereof.

7. The method of claim 1 wherein said alloy comprising from about 40 to about 90 percent by weight manganese is admixed with from about 15 to about 50 percent by weight sulfur, and from about 2 to about 30 percent by weight iron pyrite.

8. The method of claim 1 wherein said yield of manganese sulfide is at least 50%.

9. The method of claim 2 further comprising the step of recovering said manganese sulfide by separating it from unreacted manganese, sulfur, and iron button.

10. The method of claim 2 wherein the iron pyrite is present in an amount effective to control the exothermicity of said reaction.

11. The method of claim 2 wherein said manganese is in the form of a powder, flake material, or combination thereof and said sulfur is in the form of a powder, flake material, or combination thereof.

12. The method of claim 2 wherein said manganese particle size is from about 0.001 to about 0.5 inches, said sulfur particle size is from about 0.001 to about 0.5 inches.

13. The method of claim 2 wherein from about 40 to about 90 percent by weight manganese is admixed with from about 15 to about 50 percent by weight sulfur, and from about 2 to about 30 percent by weight iron pyrite.

14. The method of claim 2 wherein said yield of manganese sulfide is at least 50%.

15. The method of claim 3 further comprising the step of recovering said manganese sulfide by separating it from unreacted manganese, sulfur, and iron button.

16. The method of claim 3 wherein the iron pyrite is present in an amount effective to control the exothermicity of said reaction.

17. The method of claim 3 wherein said manganese is in the form of a powder, flake material, or combination thereof and said sulfur is in the form of a powder, flake material, or combination thereof.

18. The method of claim 3 wherein said manganese particle size is from about 0.001 to about 0.5 inches, said sulfur particle size is from about 0.001 to about 0.5 inches.

19. The method of claim 3 wherein from about 40 to about 90 percent by weight manganese is admixed with from about 15 to about 50 percent by weight sulfur, and from about 2 to about 30 percent by weight iron pyrite.

20. The method of claim 3 wherein said yield of manganese sulfide is at least 50%.

* * * * *